US009606560B2

(12) United States Patent
Lederer et al.

(10) Patent No.: US 9,606,560 B2
(45) Date of Patent: Mar. 28, 2017

(54) COMPUTER SYSTEM, ARRANGEMENT FOR REMOTE MAINTENANCE AND REMOTE MAINTENANCE METHOD

(75) Inventors: Friedrich Lederer, Thalmässing (DE); Immanuel Köhn, Augsburg (DE); Werner Frank, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 914 days.

(21) Appl. No.: 13/992,512

(22) PCT Filed: Dec. 5, 2011

(86) PCT No.: PCT/EP2011/071763
§ 371 (c)(1),
(2), (4) Date: Jul. 19, 2013

(87) PCT Pub. No.: WO2012/080022
PCT Pub. Date: Jun. 21, 2012

(65) Prior Publication Data
US 2014/0316603 A1 Oct. 23, 2014

(30) Foreign Application Priority Data
Dec. 14, 2010 (DE) .................. 10 2010 054 436

(51) Int. Cl.
G05F 1/625 (2006.01)
G06F 1/32 (2006.01)
H04L 12/12 (2006.01)
(52) U.S. Cl.
CPC ............ G05F 1/625 (2013.01); G06F 1/3209 (2013.01); H04L 12/12 (2013.01); Y02B 60/34 (2013.01)

(58) Field of Classification Search
None
See application file for complete search history.

(56) References Cited

U.S. PATENT DOCUMENTS 7,343,506 B1   3/2008 Fenwick
7,650,519 B1   1/2010 Hobbs et al.
(Continued)

FOREIGN PATENT DOCUMENTS

DE   10 2006 043 636   3/2008
DE   10 2008 031 536   1/2010
(Continued)

OTHER PUBLICATIONS

English translation of Japanese Office Action dated Jul. 14, 2015 of corresponding Japanese Application No. 2013-543638.

Primary Examiner — Sean Shechtman
(74) Attorney, Agent, or Firm — DLA Piper LLP (US)

(57) ABSTRACT

A computer system includes a power supply unit providing at least one first supply voltage for operation of the computer system, a system board has at least one first power supply line that distributes the at least one first supply voltage; at least one processor arranged on the system board and coupled to the first power supply line that executes program code of user programs; a system monitoring module arranged on the system board having a microcontroller that executes program code for remote maintenance; at least one network interface coupled to the system monitoring module; and at least one splitter, coupled to the network interface that taps off a remote feed voltage provided via the network interface and feeds in a second supply voltage into at least one second power supply line of the system board, the second power supply line being coupled to the system monitoring module.

15 Claims, 3 Drawing Sheets

(56) References Cited

U.S. PATENT DOCUMENTS

| | | |
|---|---|---|
| 2008/0072030 A1 | 3/2008 | Karpa |
| 2008/0175227 A1 | 7/2008 | Moore et al. |
| 2008/0244297 A1* | 10/2008 | Fenwick .................. G06F 1/26 713/340 |
| 2009/0091182 A1* | 4/2009 | Tamada ................ G03G 15/80 307/2 |
| 2010/0106984 A1* | 4/2010 | Weng ...................... G06F 1/266 713/300 |
| 2011/0110129 A1 | 5/2011 | Busch |

FOREIGN PATENT DOCUMENTS

| | | |
|---|---|---|
| JP | 6-165377 | 6/1994 |
| JP | 2009-094623 | 4/2009 |
| JP | 2009-284116 | 12/2009 |

\* cited by examiner

COMPUTER SYSTEM, ARRANGEMENT FOR REMOTE MAINTENANCE AND REMOTE MAINTENANCE METHOD

TECHNICAL FIELD

This disclosure relates to a computer system comprising a power supply unit, a system board, at least one processor arranged on the system board and a system monitoring module arranged on the system board. The disclosure also relates to an arrangement for remote maintenance comprising such a computer system, and to a remote maintenance method.

BACKGROUND

Computer systems having a system monitoring module arranged on a system board are known. For example, a computer system having a processor that executes program code, a first non-volatile memory that stores first program code to start the computer system and a system monitoring module operably connected to the processor and the first non-volatile memory is known from DE 10 2006 043636 A1. Among other things, the known computer system enables a method of updating program code to start the computer system to be executed.

Other maintenance tasks such as, for example, performing system adjustments and calling up any fault and status messages can also be performed via a system monitoring module. Providing for maintenance by a remote centralized remote maintenance system requires communication between the remote maintenance system and the system monitoring module, preferably via a network interface.

The problem with such computer systems is that, to provide the remote maintenance function also in a switched-off state in which the computer is not needed by a user, they must be supplied with so-called "standby" supply voltage to continue to supply the system monitoring module with operating power. The continuing supply with a standby supply voltage then causes a mostly unnecessary power consumption from a power supply system.

To further reduce the power consumption of known computer systems, a power supply unit having a circuit arrangement which allows a voltage transformer of the power supply lit to be completely isolated from a primary supply voltage, and thus reduces the power consumption of the computer system in a switched-off state, is known from DE 10 2008 031536 A1. The problem with the circuit arrangement described therein is that, in particular, it is not suitable for use with computer systems in which remote maintenance is to be carried out by a centralized remote maintenance system.

Among other things, it could be helpful to provide a computer system, an arrangement comprising a computer system and a method to perform remote maintenance which, in spite of reduced power consumption of the computer system, allows remote maintenance functions to be performed.

SUMMARY

We provide a computer system including a power supply unit that provides at least one first supply voltage for operation of the computer system, a system board having at least one first power supply line that distributes the at least one first supply voltage; at least one processor arranged on the system board and coupled to the first power supply line that executes program code of user programs; a system monitoring module arranged on the system board having a microcontroller that executes program code for remote maintenance; at least one network interface coupled to the system monitoring module; and at least one splitter, coupled to the network interface that taps off a remote feed voltage provided via the network interface and feeds in a second supply voltage, generated from the remote feed voltage, into at least one second power supply line of the system board, the second power supply line being coupled to the system monitoring module.

We also provide an arrangement for remote maintenance including at least one remote maintenance system having a first network interface at least one computer system comprising at least one processor, a power supply unit that provides at least one first supply voltage for the operation of the at least one processor, a system monitoring module, at least one network interface coupled to the system monitoring module, and at least one splitter coupled to the network interface that taps off a remote feed voltage provided via the network interface and feeds a second supply voltage, generated from the remote feed voltage, to the system monitoring module; and at least one network component having at least one first and at least one second network port, the network component being coupled to the remote maintenance system via the first network non and to the computer system via the second network port.

We further provide a remote maintenance method including selecting, by a remote maintenance system, a computer system to be maintained, providing a remote feed voltage via a network interface of the selected computer system; executing program code for remote maintenance by a system monitoring module, fed remotely via the network interface, of the computer system; and establishing a data link between the remote maintenance system and the system monitoring module to execute maintenance functions on the selected computer system.

LIST OF REFERENCE DESIGNATIONS

Figure 1:
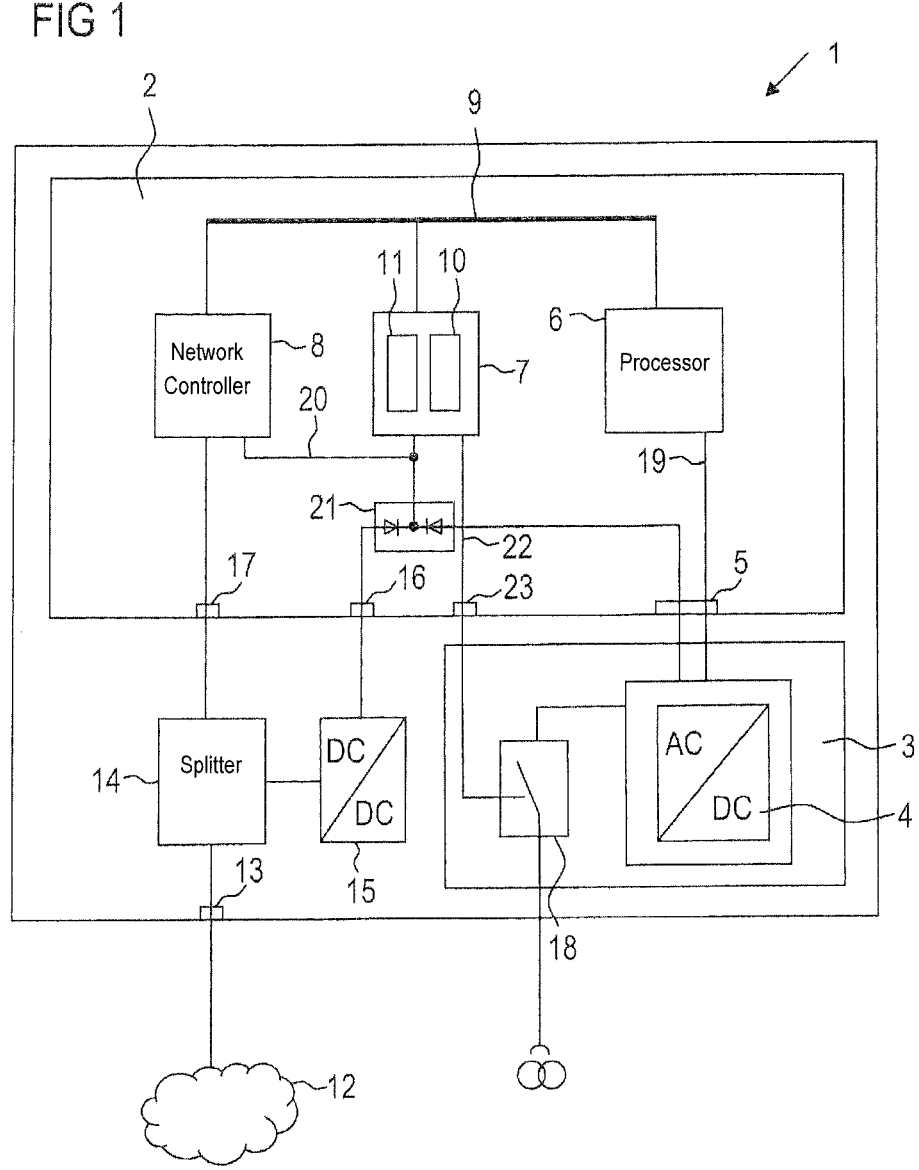
FIG. 1 shows a diagrammatic representation of a computer system.

1 Computer system
2 System board
3 Power supply unit
4 First voltage transformer
5 First plug-in connector
6 Processor
7 System monitoring module
8 Network controller
9 Bus system
10 Microcontroller
11 Non-volatile memory
12 Data network
13. Network interface
14 Splitter
15 Second voltage transformer
16 Second plug-in connector
17 Third plug-in connector 18 Switching element
19 First supply line
20 Second supply line
21 Switching device
22 Control line
23 Fourth plug-in connector
24 Network switch
25 Network port
26 Control device
27 Power supply unit
28 First network cable
29 Second network cable
30 Remote maintenance system
31 Remote maintenance application

DETAILED DESCRIPTION

Our computer system may comprise a power supply unit for the provision of at least one first supply voltage to operate the computer system, a system board having at least one first power supply line that distributes the at least one first supply voltage and at least one processor arranged on the system board and coupled to the first power supply line that executes program code of user programs is described. The computer system also may comprise a system monitoring module arranged on the system board having a microcontroller that executes program code for remote maintenance, at least one network interface coupled to the system monitoring module and at least one splitter, coupled to the network interface to tap off a remote feed voltage provided via the network interface and feed in a second supply voltage, generated from the remote feed voltage tapped off, into at least one second supply line of the system board, the second power supply line being coupled to the system monitoring module.

Such a computer system having two different power supply lines which operate different power supply levels of the computer system allows a system monitoring module to be supplied with power independently of other components of the computer system, especially of the processor. The system monitoring module then only consumes a relatively low battery power which is provided via a network interface. For example, the so-called Power-over-Ethernet protocol (PoE) according to the IEEE 802.3af and IEEE 802.3at standards is suitable for this purpose.

Advantageously, the power supply unit may have at least one switching element that interrupts a primary grid voltage. The system monitoring module may be connected to the power supply unit via at least one control line and configured to close the switching element on request from a remote maintenance command contained in the program code for remote maintenance so that the power supply unit connects to the primary grid voltage. Such a computer system allows a power supply unit to be switched on under remote control and, therefore, to supply further components of the computer system with a supply voltage.

Further advantageously, the program code for remote control may comprise a first and a second set of remote maintenance functions, the system monitoring module being configured to execute the first set of remote maintenance functions in the presence of the first or the second supply voltage and execute the second set of remote maintenance functions only in the presence of at least the second supply voltage. Dividing remote maintenance functions into a first and a second set allows the computer system to be supplied with supply voltage in a demand-driven manner in dependence on the desired remote maintenance function.

An arrangement for remote maintenance is described which ma comprise at least one remote maintenance system having a first network interface, at least one computer system having a second network interface and at least one network component having at least one first and at least one second network port. In this context, the network component is coupled to the remote maintenance system via the first network port and to the computer system via the second network port. Such an arrangement is particularly suitable for remote maintenance of a computer system.

Advantageously, the at least one network component may have a control device to selectively activate and deactivate the remote feed voltage at the second network port and the remote maintenance system may be configured to drive the control device on performance of a remote maintenance function such that the remote feed voltage is provided at the second network port. Such an arrangement allows a demand-driven provision of the remote feed voltage so that in times in which no remote maintenance function is needed, provision of an unnecessary remote feed voltage can be omitted.

A remote maintenance method that may have the following steps is described:
  selecting a computer system to be maintained by a remote maintenance system
  providing a remote feed voltage via a network interface of the selected computer system
  executing program code for remote maintenance by a system monitoring module, remotely fed via the network interface, of the second computer system and
  establishing a data link between the remote maintenance system and the system monitoring module to execute maintenance functions on the selected computer system.

Further advantages are explained in the appended claims and the detailed description following.

In the text which follows, our systems, arrangements and methods will be explained in greater detail by examples, referring to the figures.

FIG. 1 shows a computer system 1. The computer system 1 is, for example, a workstation computer or a server computer in a company network. In the example, the computer system 1 comprises, among other things, a system board 2 and a power supply unit 3.

The power supply unit 3 comprises a voltage transformer 4 that transforms an alternating grid voltage into at least one first supply voltage for the system board 2. The voltage transformer 4 delivers two different supply voltages via a first plug-in connector 5 to the system board 2. For example, these are direct voltages of 5.0 and 3.3 V. Naturally, other or further supply voltages can also be provided by the power supply unit 3.

Various components for computer system 1 are arranged on the system board 2. Among other things the system board 2 comprises a processor 6, a system monitoring module 7, and a network controller 8. Alternatively, the system monitoring module 7 contains an integrated network controller. The components 6, 7 and 8 connect to one another via one or more bus systems 9.

In the example, the system monitoring module 7 comprises a microcontroller 10 and a nonvolatile memory 11. The microcontroller 10 executes, among other things, program code from the non-volatile memory 11 configured to monitor the proper operation and configuration of the computer system 1. Among other things, such modules are also known as baseboard management controllers (BMC), remote management chip sets (RMC) or system management module. The system monitoring module 7 can access the processor 6 and other components of the computer system 1, for example, via the bus system 9 or also via another system management bus, not shown in FIG. 1.

Furthermore, the system monitoring module 7 can access the network controller 8 and can also be activated by it so that it is possible to send out alarm messages and receive configuration requests via a data network 12 coupled to the network controller 8. For this purpose, the network controller 8 comprises at least the components required to establish a physical link and access a network medium. Other components, especially software components that implement suitable protocols can be contained, for example, in the program code executed by the system monitoring module 7. Examples of suitable protocols for this purpose are known from the so-called "active management technology" by Intel (iAMT) or the "desktop and mobile architecture for system hardware" (DASH) of the Distributed Management Task Force (DMTF).

The computer system 1 furthermore comprises a network interface 13 that couples the computer system 1 to the data network 12. In the example shown, the network interface 13 is not coupled directly to the system board 2. Instead, there is a connection between the network interlace 13 and a splitter 14 that taps off a remote feed voltage provided via the network interface 13. In the example shown, the remote feed voltage is supplied to a second voltage transformer 15. For example, the second voltage transformer 15 is a direct-voltage converter which generates from a remote feed voltage of, for example, 48 V a second supply voltage of for example, 5 V. In the case of corresponding voltages, the remove feed voltage can naturally also be used directly as second supply voltage. The second voltage transformer 15 is then omitted. The second supply voltage is provided via a second plug-in connector 16 of the system board 2. Furthermore, an alternating-voltage component of the received network system is provided to the network controller 8 via a third plug-in connector 17. The alternating-voltage component provided contains the useful data transmitted via the data network 12 and is typically free of the remote feed direct voltage.

The components 13, 14 and 15 can be provided either as separate single components in the computer system 1, jointly with the network controller 8 on a network card separate from the system board 2 or as system components arranged on the system board 2 in different ways. If the components are not arranged jointly on a common board, corresponding connections must be provided, for example, in the form of plug-in connectors to couple the components to one another electrically.

To separate the computer system 1 from a primary alternating grid voltage in a switched-off state, the power supply unit 3 optionally comprises a switching element 18 to separate a primary grid line. The switching element 18 is, for example, a relay which is switched on or of by suitable control electronics of the computer system 1 when necessary.

To supply the different components of the computer system 1 with power, at least one first supply line 19 and a second supply hue 20 are provided on the system board 2 which define different power supply levels. Naturally, a plurality of supply lines can also be provided, for example for different voltages or redundant supply paths. In the example shown, the first supply line 19 is used to, among other things, supply the processor 6 with a supply voltage of 3.3 V which is provided by the first voltage transformer 4 of the power supply unit 3. The second supply line 20 is used to supply the system monitoring module 7 and the network controller 8 via the second supply level.

In the example, the second supply line 20 is supplied with a direct voltage of 5.0 V optionally by the first voltage transformer 4 of the power supply unit 3 or by the second voltage transformer 15 which is coupled to the splitter 14. A switching device 21 is used for this purpose. In the simplest case, the switching device 21 is only an injection circuit to inject the provided supply voltages via injection diodes. Naturally, an active switching device 21 can also be provided which selects the first voltage transformer 4 as a supply source when the power supply unit 3 is in operation and the second voltage transformer 15 as a supply source when the power supply unit 3 is turned off.

In the example shown, the system monitoring module 7 connects to the switching element 18 of the power supply unit 3 via a control line 22 and a fourth plug-in connector 23. The system monitoring module 7 can switch on the power supply unit 3 if necessary by the control line 22. For example, the second supply voltage can be connected to a drive coil of a relay via a power transistor.

The computer system 1 shown in FIG. 1 is suitable particularly for remote maintenance, in an arrangement as described with reference to FIG. 2 in the text which follows, and to execute a method for remote maintenance as described with reference to FIG. 3 in the text which follows.

Figure 2:
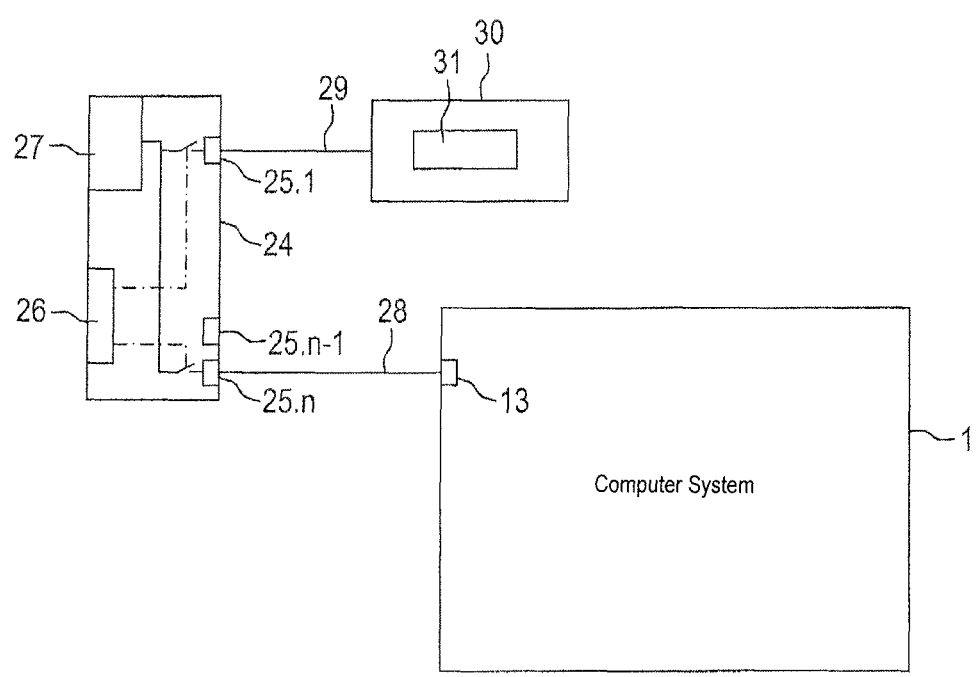
FIG. 2 shows a diagrammatic representation of an arrangement comprising the computer system according to FIG. 1.

In FIG. 2, an arrangement comprising the computer system 1 and a network switch 24 is shown. The network switch 24 has n network ports 25.1 to 25.n. The network switch 24 is, for example, a so-called "managed" Power-Over-Ethernet switch according to IEEE standard 802.3af or 802.3at. The network switch 24 comprises an inbuilt control device 26 in the form of a microcontroller via which a remote feed voltage can be applied selectively to the individual network ports 25.1 to 25.n. For this purpose, the network switch 24 also has an inbuilt power supply unit 27.

In the example shown, the computer system 1 connects to the network port 25n of the network switch 24 via a first network line 28. Furthermore, a remote maintenance system 30 is coupled to the network switch 24 via the network port 25.1 and a second network line 29. On the remote maintenance system 30, a remote maintenance application 31 runs which comprises program code to drive the control device 26 and the program code, executed by the system monitoring module 7, to monitor the computer system 1. Instead of the network switch 24, other network components such as for example, bridges or hubs, can also be used to connect the computer system 1 and the remote maintenance system 30.

Figure 3:
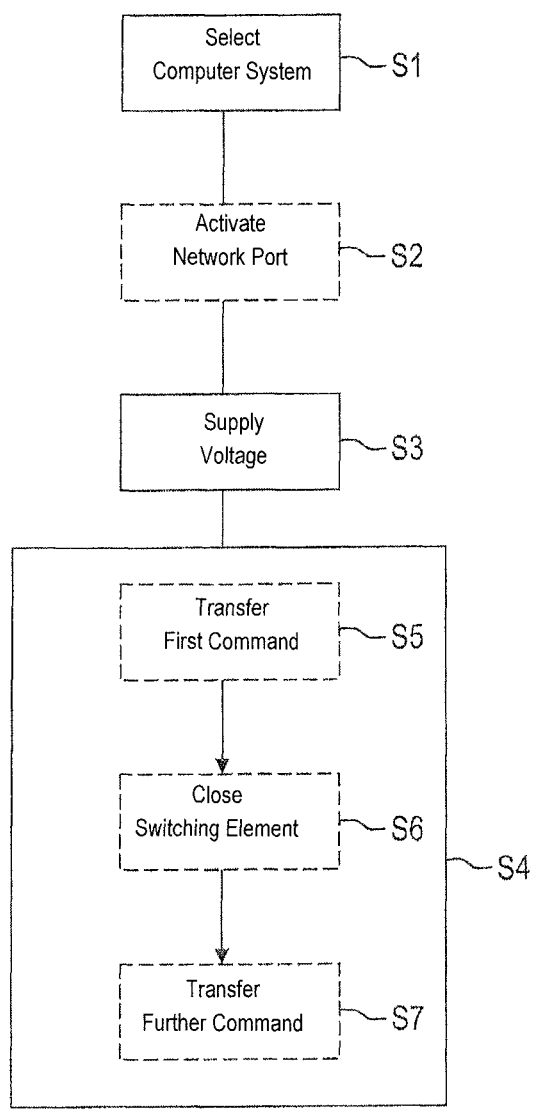
FIG. 3 shows a flow chart of a remote maintenance method.

FIG. 3 shows a method for remote maintenance of the computer system 1 according to FIG. 1 in the arrangement according to FIG. 2.

In a first step S1, the remote maintenance system 30 selects a computer system 1 which is to be remotely maintained. For example, a computer system 1 on which a new firmware component is to be installed can be selected from an electronic database having an inventory list.

In an optional step S2, a network port 25.n, which is allocated to the selected computer system 1 is activated to be supplied with a remote feed voltage. For example, the remote maintenance system 30 can inquire from the same or another database which network port 25 the selected computer system 1 is connected to. Via a management interface of the network switch 24, its control device 26 is then driven such that the corresponding network port 25.n is supplied with the remote feed voltage by the power supply unit 27 of the network switch 24. The configuration ran be effected manually, for example, via a web interface of the network switch 24 or automatically by the remote maintenance application 31. In principle, however, it is also possible to apply a remote feed voltage permanently to the network port 25.

In a subsequent step S3, a system monitoring module 7 of the computer system 1 is supplied with a supply voltage via the second supply line 20. For this purpose, the remote feed voltage provided by the network switch 24 is tapped off in the splitter 14 and provided to the second voltage transformer 15. The second voltage transformer 15 transforms the remote feed voltage into a suitable second supply voltage to supply the system monitoring module 7 and provides it via the second plug-in connector 16 of the system board 2.

The system monitoring module 7 is supplied with sufficient energy to perform simple remote maintenance tasks and inquiries even if the computer system 1 is completely separated from a power supply network at this time, for example, because the switching element 18 has interrupted the primary grid line or a user has pulled the grid plug off the computer system 1. In particular, the power of up to 15 W, provided via the network interface 13, is sufficient to supply the system monitoring module 7 and the network controller 8. When the second supply voltage is present, the microcontroller 10 of the system monitoring module 7 starts the program code deposited in the non-volatile memory 11 to provide a first set of remote maintenance functions which can be executed without supplying power to other components of the computer system 1.

In a subsequent step S4, communication can then take place between the remote maintenance system 30 and the system monitoring module 7 via the data network 12. For example, the remote maintenance system 30 can request information about a BIOS or other firmware version stored on the system board 2 or retrieve error messages temporarily stored in the non-volatile memory 11.

In a further example, the computer system 1 and the remote maintenance method described are configured to also supplying other components of the computer system 1 with a supply voltage to also perform elaborate remote maintenance tasks. For example, the processor 6 requires for its operation as a rule an electrical power of more than 15 W, which cannot be provided via the network interface 13 as a rule. For this purpose, the system monitoring module 7 is connected as shown in FIG. 1 to a switching element 18 to activate the power supply unit 3 of the computer system 1 via a control line 22.

In FIG. 3, the steps necessary for this are shown as optional sub-steps within method step S4.

In a first sub-step S5, a first command is transferred from the remote maintenance system 30 to the system monitoring module 7. The first command instructs the system monitoring module 7 to switch on the power supply unit 3 of the computer system 1 to be able to access further components of the computer system 1.

For this purpose, the system monitoring module 7 transfers a suitable drive signal via the control line 22 to the switching element 18. The switching element 18 is thereupon closed in sub-step S6 so that a grid voltage is switched through to the voltage transformer 4 of the power supply unit 3. The voltage transformer 4 thereupon generates one or more further supply voltages which, for example, are delivered via the first plug-in connector 5 to the system board 2 of the computer system 1. Further components of the computer system 1 thereupon start. For example, the processor 6 or other components not shown in FIG. 1 such as hard disks or other storage drives of the computer system 1 can be supplied with a first supply voltage.

If the components of the computer system 1 are in an operational state, a further command can be transferred in a further sub-step S7 from the remote maintenance system 30 to the system monitoring module 7 and executed to install, for example, new files on a hard disk drive of the computer system 1.

After a successful conclusion of the maintenance work, the computer system 1 can of course equivalently be shut down again and, if necessary, separated from the power supply network. If the system monitoring module 7 is also not to be supplied further with an operating voltage, the remote maintenance system 30 can configure the control device 26 of the network switch 24 such that the network port 25.*n* allocated to the computer system 1 is no longer supplied with the remote feed voltage.

The computer system described, the arrangement and the method allow a supply voltage to be applied to individual components of a computer system in a modular manner. This results in maintainability of the computer system with simultaneous energy efficiency of the computer system and an arrangement containing the computer system. Ideally, the computer system can be separated completely from the power supply network. It is even possible to configure a network component such that it always supplies a remote feed voltage only to the computer systems which are currently maintained. No unnecessary standby power is therefore consumed either by the computer system or by the network component if no computer system is currently maintained.

The invention claimed is:

1. A computer system comprising:
   a power supply unit that provides at least one first supply voltage for operation of the computer system,
   a system board having at least one first power supply line that distributes the at least one first supply voltage;
   at least one processor arranged on the system board and coupled to the first power supply line that executes program code of user programs;
   a system monitoring module arranged on the system board having a microcontroller that executes program code for remote maintenance configured to monitor proper operation and configuration of the computer system, send out alarm messages, and receive configuration requests via a data network;
   at least one network interface coupled to the system monitoring module that couples the computer system to the data network; and
   at least one splitter, coupled to the network interface that taps off a remote feed voltage provided via the network interface and feeds in a second supply voltage, generated from the remote feed voltage, into at least one second power supply line of the system board, the second power supply line being coupled to the system monitoring module so that the system monitoring module can be supplied with sufficient energy to perform simple remote maintenance tasks and inquiries even if the computer system is completely separated from a power supply network.

2. The computer system according to claim 1, wherein the network interface and the splitter are arranged on the system board.

3. The computer system according to claim 1, wherein the network interface and the splitter are arranged on a network card having a network controller, the system board having a plug-in connector that feeds in the remote feed voltage tapped off by the splitter or the second supply voltage via a cable link.

4. The computer system according to claim 1, wherein the power supply unit has at least one switching element that interrupts a primary grid voltage and the system monitoring module connects to the power supply unit via at least one control line and is configured to close the switching element on request from a remote maintenance command contained in the program code for remote maintenance so that the power supply unit connects to the primary grid voltage.

5. The computer system according to claim 4, wherein the at least one switching element is a relay, a drive coil of the relay being supplied with switching energy from the second supply voltage.

6. The computer system according to claim 4, wherein the program code for remote maintenance comprises a first and a second set of remote maintenance functions, the system monitoring module being configured to execute the first set of remote maintenance functions in the presence of the first or the second supply voltage and executing the second set of remote maintenance functions only in the presence of at least the second supply voltage.

7. The computer system according to claim 2, wherein the power supply unit has at least one switching element that interrupts a primary grid voltage and the system monitoring module connects to the power supply unit via at least one control line and is configured to close the switching element on request from a remote maintenance command contained in the program code for remote maintenance so that the power supply unit connects to the primary grid voltage.

8. The computer system according to claim 3, wherein the power supply unit has at least one switching element that interrupts a primary grid voltage and the system monitoring module connects to the power supply unit via at least one control line and is configured to close the switching element on request from a remote maintenance command contained in the program code for remote maintenance so that the power supply unit connects to the primary grid voltage.

9. An arrangement for remote maintenance comprising:
at least one remote maintenance system having a first network interface;
at least one computer system comprising:
a system board having at least one first power supply line that distributes at least one first supply voltage;
at least one processor arranged on the system board and coupled to the first power supply line that executes program code of user programs;
a power supply unit that provides the at least one first supply voltage for operation of the at least one processor;
a system monitoring module arranged on the system board having a microcontroller that executes program code for remote maintenance configured to monitor the proper operation and the configuration of the computer system, send out alarm messages, and receive configuration requests via a data network;
at least one network interface coupled to the system monitoring module that couples the computer system to the data network; and
at least one splitter coupled to the network interface that taps off a remote feed voltage provided via the network interface and feeds in a second supply voltage, generated from the remote feed voltage, into at least one second power supply line of the system board, the second supply line being coupled to the system monitoring module so that the system monitoring module can be supplied with sufficient energy to perform simple remote maintenance tasks and inquiries even if the computer system is completely separated from a power supply network; and
at least one network component having at least one first and at least one second network port, the network component being coupled to the remote maintenance system via the first network port and to the computer system via the second network port.

10. The arrangement according to claim 9, wherein the at least one processor and the system monitoring module are arranged on a common system board and are supplied with the first supply voltage and the second supply voltage by a first power supply line and a second power supply line, respectively.

11. The arrangement according to claim 9, wherein the at least one network component has a control device that selectively activates and deactivates the remote feed voltage at the second network port and the remote maintenance system is configured to drive the control device on performance of a remote maintenance function such that the remote feed voltage is provided at the second network port.

12. A remote maintenance method comprising:
selecting, by a remote maintenance system, a computer system to be maintained, the computer system comprising a system monitoring module with a microcontroller that monitors proper operation and configuration of the computer system, sends out alarm messages, and receives configuration requests via a data network,
providing a remote feed voltage via a network interface of the selected computer system;
executing program code for remote maintenance by the system monitoring module, fed remotely with the feed voltage, providing sufficient energy via the network interface of the computer system to perform simple remote maintenance tasks and inquiries even if the computer system is completely separated from a power supply network; and
establishing a data link between the remote maintenance system and the system monitoring module to execute maintenance functions on the selected computer system.

13. The method according to claim 12 further comprising activating a network port of a network component to provide the remote feed voltage at the network interface of the selected computer system.

14. The method according to claim 12 further comprising:
transferring a first remote maintenance command to switch on a switching element of a power supply unit of the selected computer system;
supplying a first supply voltage to the selected computer system by the power supply unit; and
transferring a second remote maintenance command to execute a maintenance function to access at least one component of the computer system supplied with the first supply voltage by the power supply unit.

15. The method according to claim 13 further comprising:
transferring a first remote maintenance command to switch on a switching element of a power supply unit of the selected computer system;
supplying a first supply voltage to the selected computer system by the power supply unit; and
transferring a second remote maintenance command to execute a maintenance function to access at least one component of the computer system supplied with the first supply voltage by the power supply unit.

* * * * *